United States Patent [19]
Jaffee et al.

[11] Patent Number: 5,146,877
[45] Date of Patent: Sep. 15, 1992

[54] PARTICULATE ABSORBENT MATERIAL HAVING CONTROLLED BULK DENSITY

[75] Inventors: Richard M. Jaffee, Lincolnwood; William F. Moll, Crystal Lake; G. Robert Goss, Quincy, all of Ill.

[73] Assignee: Oil-Dri Corporation of America, Chicago, Ill.

[21] Appl. No.: 686,702

[22] Filed: Apr. 17, 1991

[51] Int. Cl.$^5$ .............................. A01K 29/00
[52] U.S. Cl. .................................... 119/172
[58] Field of Search ................. 119/171, 172, 173

[56] References Cited

U.S. PATENT DOCUMENTS

| | | | |
|---|---|---|---|
| 4,157,696 | 6/1979 | Carlberg | 119/171 X |
| 4,203,388 | 5/1980 | Cortigene et al. | 119/172 X |
| 4,311,115 | 1/1982 | Litzinger | 119/172 |
| 4,619,862 | 10/1986 | Sokolowski et al. | 119/172 X |
| 4,625,679 | 12/1986 | Hill | 119/172 |
| 4,686,937 | 8/1987 | Rosenfeld | 119/173 |
| 4,704,989 | 11/1987 | Rosenfeld | 119/173 |
| 4,721,059 | 1/1988 | Lowe et al. | 119/172 |
| 4,723,509 | 2/1988 | Schafer | 119/172 |
| 4,957,063 | 9/1990 | Heitfeld et al. | 119/172 |
| 5,000,115 | 3/1991 | Hughes | 119/173 |

Primary Examiner—Gene Mancene
Assistant Examiner—Thomas Price
Attorney, Agent, or Firm—Dressler, Goldsmith, Shore, Sutker & Milnamow, Ltd.

[57] ABSTRACT

A particulate absorbent material is constituted by discrete clay granules and paper granules, and usually exhibits a bulk density of about 10 lbs/ft$^3$ to about 30 lbs/ft$^3$. The weight ratio of paper granules-to-clay granules is about 0.09 to about 9. The particle size distribution for the clay granules is relatively wider than for the paper granules.

12 Claims, 4 Drawing Sheets

PARTICULATE ABSORBENT MATERIAL HAVING CONTROLLED BULK DENSITY

TECHNICAL FIELD

This invention relates to particulate animal litter.

BACKGROUND OF THE INVENTION

A heretofore commonly utilized animal litter product is particulate clay. Such animal litter is normally used on a volumetric rather than weight basis. However, the lack of uniformity in clay bulk density as a result of diverse mining and processing operations creates a packaging problem. If the bulk density is high relative to the norm for a particular package of granules, a predetermined weight will only partially fill a bag of a predetermined size. On the other hand, if the bulk density is low relative to the norm, the bag will not accommodate the required weight of the absorbent granules.

Moreover, a relatively large proportion of the absorbent capacity of the particulate clay is wasted inasmuch as a dispensed aliquot of animal litter is disposed of after use for other reasons long before its absorbent capacity has been exhausted.

It has now been found that an animal litter product of controlled bulk density and adequate absorbent capacity can be produced by certain combinations of particulate clay and paper granules. Such animal litter product provides a desirable balance of benefit, convenience and efficacy for the consumer inasmuch as the need to carry and handle an excessive weight or volume of product is minimized.

SUMMARY OF THE INVENTION

The present invention contemplates a particulate absorbent material, eminently well suited for use as animal litter, usually having a bulk density in the range of about 10 to about 30 pounds per cubic foot ($lbs/ft^3$) and constituted by discrete clay granules as well as discrete paper granules. The weight ratio of paper granules-to-clay granules is in the range of about 0.09 to about 9, preferably about 0.09 to about 0.5. Both the clay granules and the paper granules are of a size that passes through a U.S. Sieve Series 3.5 mesh screen, i.e., the granules have a particle size of less than about 5.6 millimeters. Preferably, the present particulate absorbent material has a particle size that passes through a U.S. Sieve Series 6 mesh screen and is retained on a U.S. Sieve Series 40 mesh screen. The particle size distribution of the clay granules is relatively wider than the particle size distribution of the paper granules.

For particles that pass through a U.S. Sieve Series 3.5 mesh screen, the mean particle size (M) and the geometric standard deviation ($\sigma$) for the clay particles is about 1 millimeter and 2.2, respectively, and for the paper granules is about 3.5 millimeters and 1.8, respectively. For a particulate absorbent material that passes through a U.S. Sieve Series 6 mesh screen and is retained on a U.S. Sieve Series 40 mesh screen, preferably the mean particle size (M) is about 1.7 millimeters for the clay particles and about 2.1 millimeters for the paper granules. The geometric standard deviation ($\sigma$) for such clay particles is about 1.6 and for such paper granules is about 1.3.

DESCRIPTION OF PREFERRED EMBODIMENTS

Figure 1:
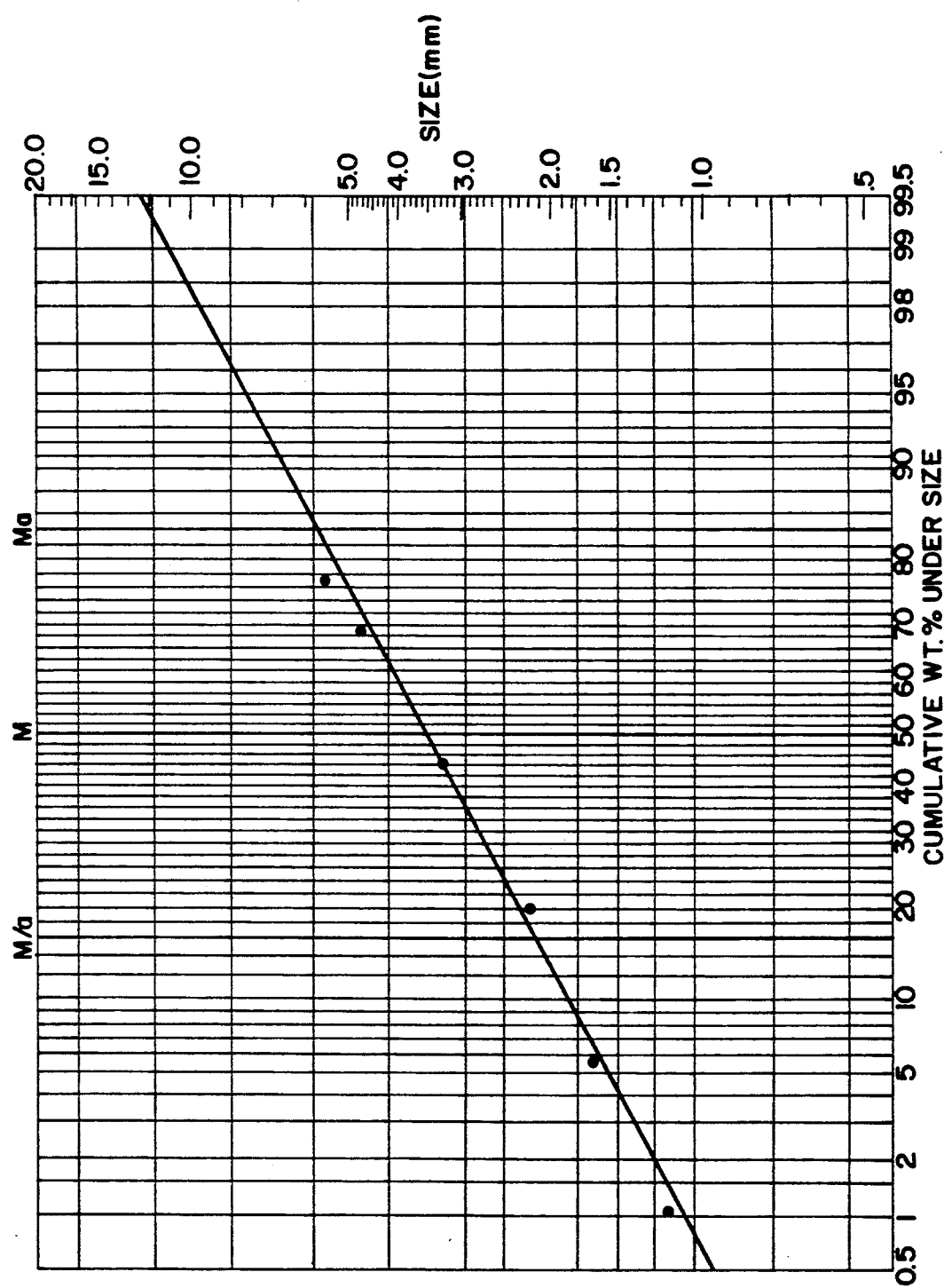
FIG. 1 is a graphical presentation of the sieve analysis of 3.5/20 mesh, U.S. Sieve Series, paper granules.
Figure 2:
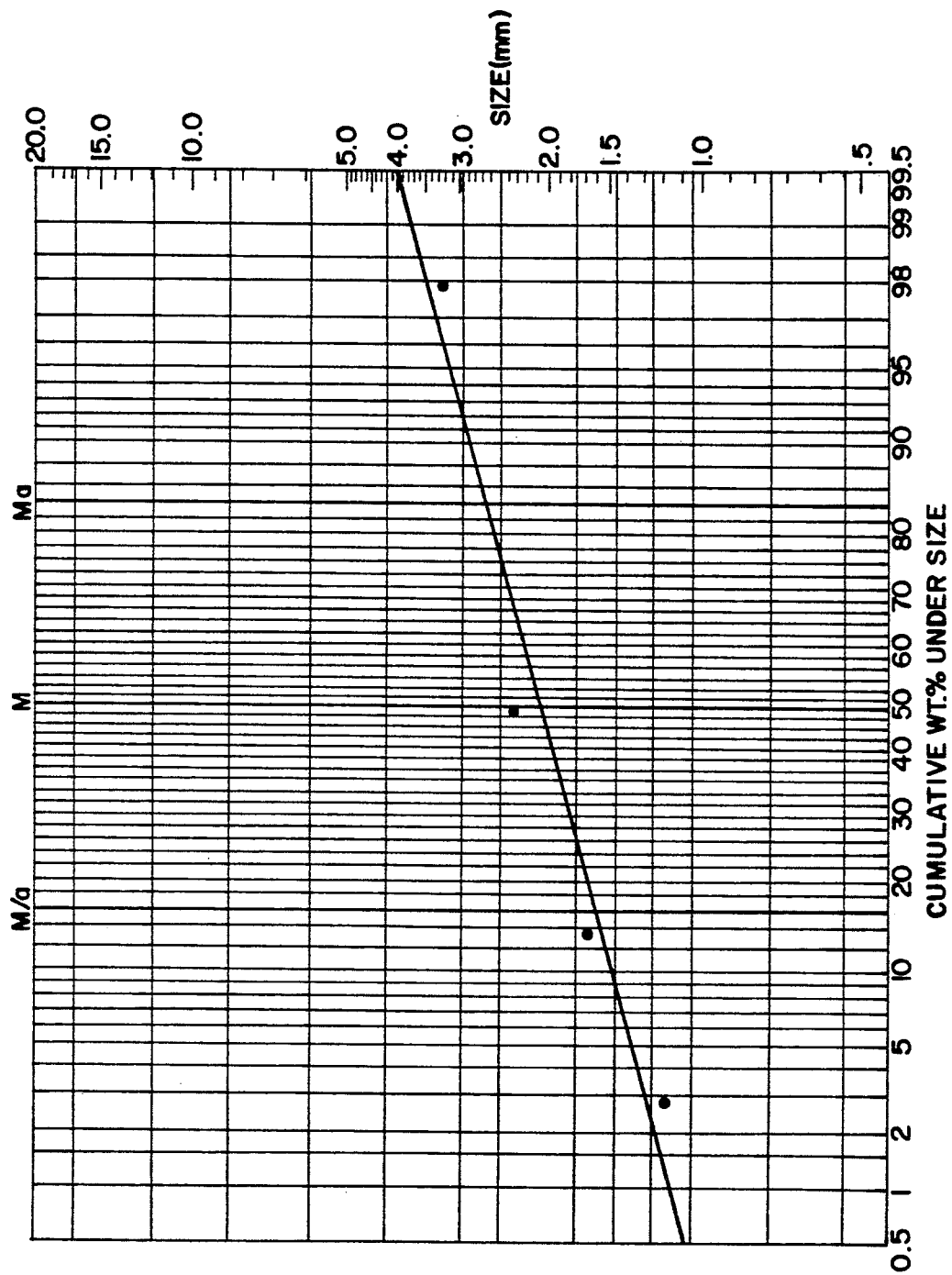
FIG. 2 is a graphical presentation of the sieve analysis of 6/40 mesh, U.S. Sieve Series, paper granules.
Figure 3:
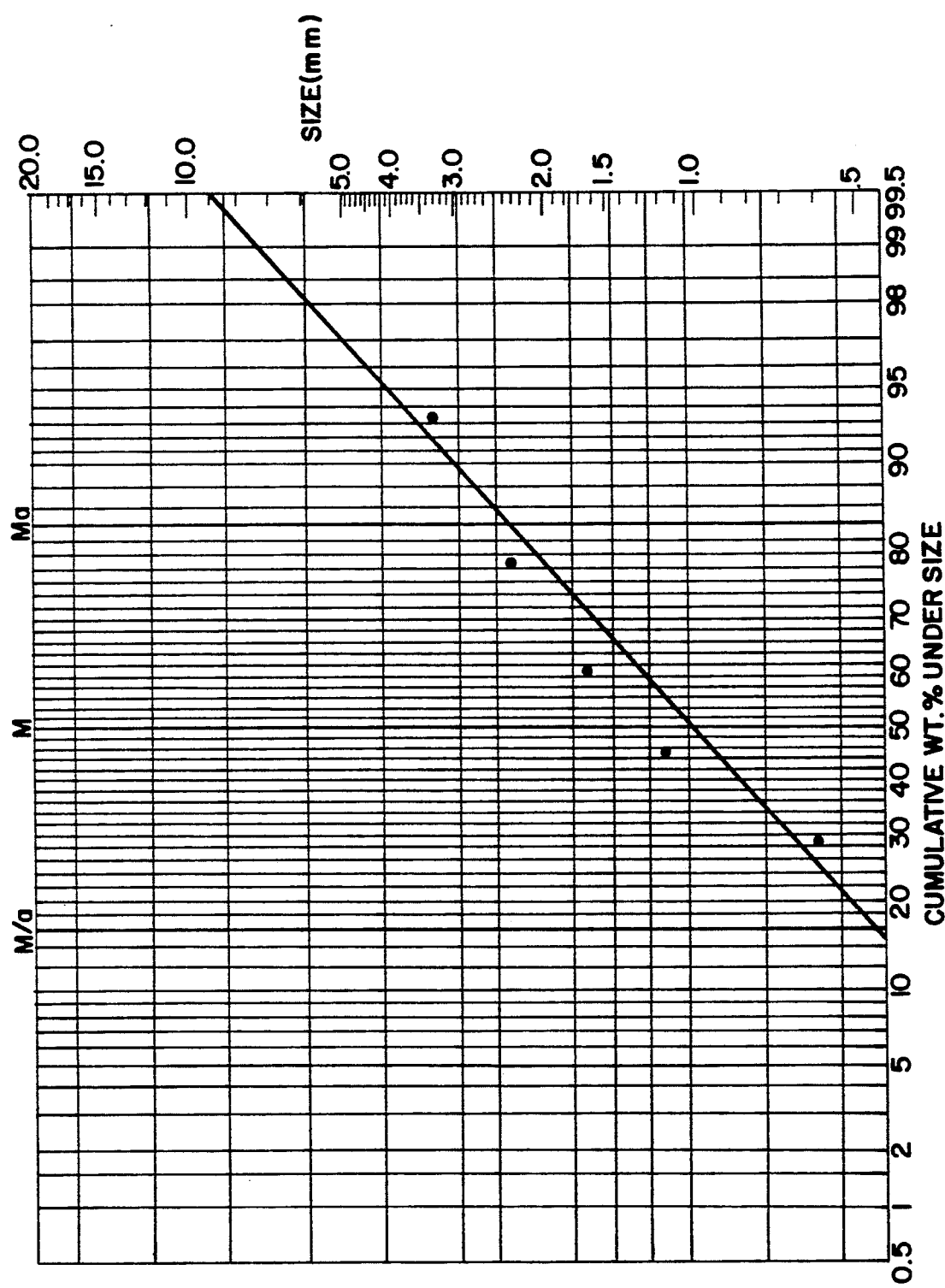
FIG. 3 is a graphical presentation of the sieve analysis of 3.5/20 mesh, U.S. Sieve Series, clay granules.
Figure 4:
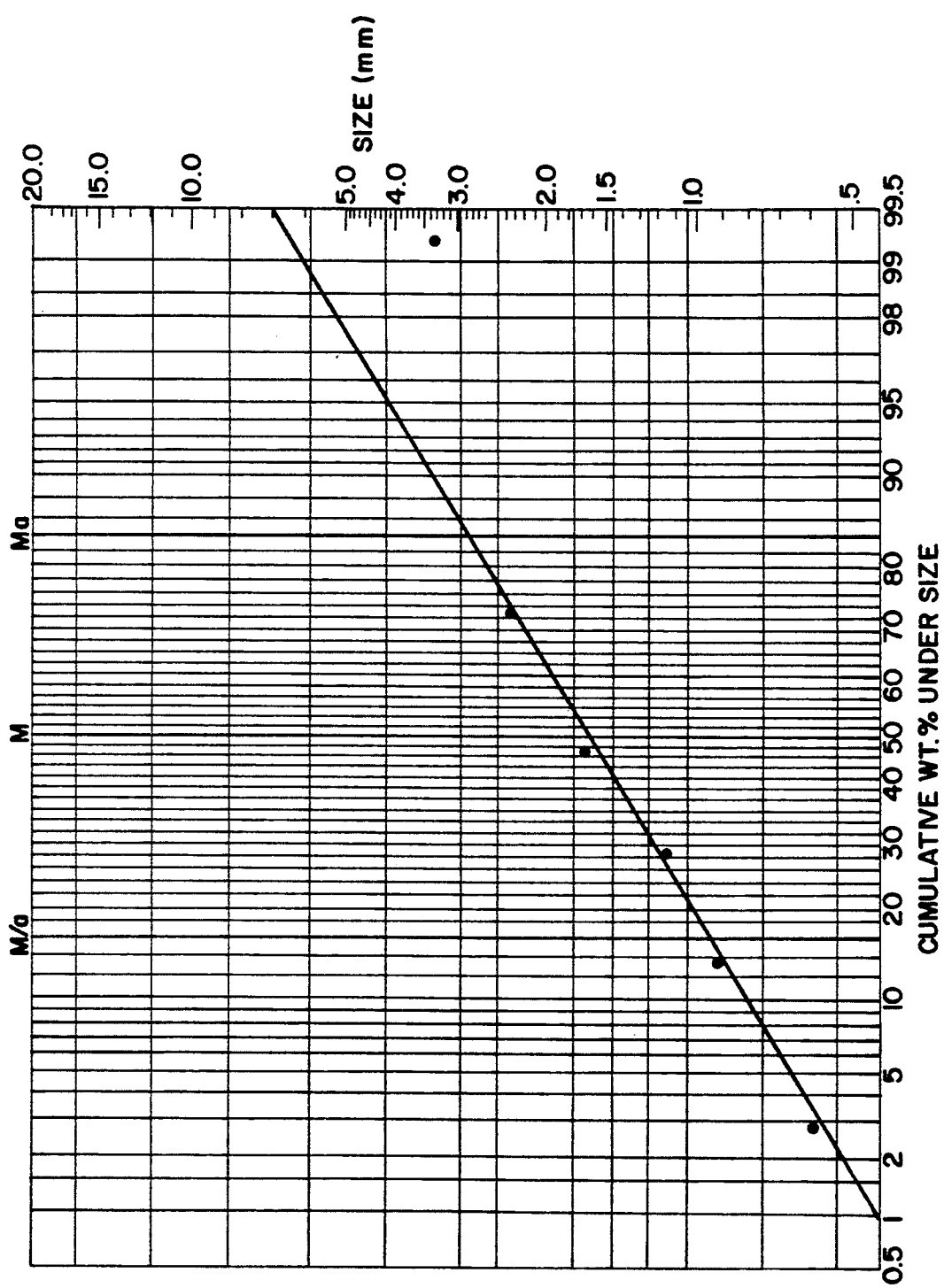
FIG. 4 is a graphical presentation of the sieve analysis of 6/40 mesh, U.S. Sieve Series, clay granules.

Paper granule and clay granule blends embodying the present invention can be readily constituted utilizing the granules of each having the appropriate bulk density and screen analysis.

In particular, the paper granules can have a bulk density in the range of about 7 to about 30 $lbs/ft^3$, and a particle size of less than about 5.6 millimeters. Preferably the paper granules have a bulk density of about 15 to about 25 $lbs/ft^3$, pass through a U.S. Sieve Series 6 mesh screen, are retained on a U.S. Sieve Series 40 mesh screen, and have a particle size distribution such that the value of M is about 2.1 and the value of $\sigma$ is about 1.3.

Paper granules suitable for the present purposes can be readily prepared using known processing expedients. Illustrative are the granules and the processes therefor described in U.S. Pat. No. 4,619,862 to Sokolowski et al. and U.S. Pat. No. 4,621,011 to Fleischer et al. Other granulation processes can also be utilized.

The clay granules suitable for commingling with the paper granules to produce the absorbent blends of the present invention are those that pass through a U.S. Sieve Series 3.5 mesh screen, and preferably those that pass through a U.S. Sieve Series 6 mesh screen but are retained on a U.S. Sieve Series 40 mesh screen.

These clay granules can have a bulk density in the range of about 30 $lbs/ft^3$ to about 40 $lbs/ft^3$. Preferably 6/40 clay granules are utilized when practicing the present invention. The bulk density of this particulate clay is in the range of about 30 $lbs/ft^3$ to about 35 $lbs/ft^3$, and the particle size distribution is such that the value of M is about 1.7 mm and the value of $\sigma$ is about 1.6.

To minimize the likelihood of particle segregation during shipping and handling, preferably the bulk density ratio of the paper phase to the clay phase in the present blends is in the range of about 0.7 to about 1.

The manner in which the clay granules and the paper granules are admixed is not critical to this invention. Care is to be taken, however, to produce a substantially uniform blend of the granules in the hereinabove stated proportions. Thus, conventional particulate solids mixing equipment can be utilized for this purpose. The agitation during mixing is not so vigorous, however, as to alter appreciably the particle size distribution of the clay and paper constituents due to fracture of the individual particles thereof. Suitable mixing equipment includes a ribbon mixer, a rotating pan with an offset blade, a tumbling barrel, a double cone mixer, and the like.

The bulk density of the resulting blend usually is in the range of about 10 to about 30 $lbs/ft^3$, preferably about 15 to about 25 $lbs/ft^3$. Surprisingly, this is less than the sum of the bulk densities of each constituent multiplied by that constituent's proportion of the composition. Inasmuch as bulk density is approximately inversely proportional to the liquid sorptive capacity of the particulate material, the present blends provide an enhanced liquid holding capacity per unit volume of the particulate absorbent blend. The weight ratio of paper granules-to-clay granules in the resulting blend is in the range of about 0.09 to about 9. A weight ratio of about 0.09 to about 0.5 is preferred.

When used as animal litter, the present absorbent blends can contain bacteriostats and odor-abating additives such as the p-hydroxybenzoates described in U.S. Pat. No. 4,622,920 to Goss. If desired, fungal growth inhibitors such as a polyvinylpyrrolidone iodine complex, a polyoxyalkylene complex with iodine, hydroxyacetic acid, chlorhexidine gluconate, chlorhexidine diacetate, and the like, can be added as well.

Likewise, a pH value indicator can be added to the particulate absorbent blend to monitor the acidity thereof during use as animal litter. Suitable pH value indicators for this purpose are those that undergo a color change at a pH value in the range of about 7.7 to 8. Illustrative of the suitable pH indicators are m-cresolsulfonphthalein (meta cresol purple), thymolsulfonphthalein (thymol blue), o-cresolsulfonphthalein (creosol red), curcumin, orange II, phenolphthalein, and the like. Preferably, the pH value indicator is incorporated into the paper- or pulp-based granules present in the absorbent blend.

Similarly, the paper- or pulp-based granules can be carriers of an acidulant or a buffering agent that assists to maintain the animal litter in the desired acidic pH value range.

Suitable acidulants are the mineral acids such as hydrochloric acid, phosphoric acid, and the like. A relatively small amount of such mineral acid is effective to materially reduce the pH value of the animal litter.

Organic acids such as citric acid, benzoic acid, phthalic acid, the like, are also suitable acidulants for the present purposes.

As a buffering agent, an alkali metal partial salt of a polybasic mineral acid such as phosphoric acid can be utilized. Illustrative such salts are the sodium and potassium partial salts of phosphoric acid.

The present invention is further illustrated by the following examples. In these examples, the reported bulk density is the loose packed density of the granules. To make this measurement, a graduated cylinder is filled to a predetermined volume, but without tamping, with the granules. The sample weight of this predetermined volume is then ascertained, and the bulk density calculated by dividing the sample weight by the sample volume. The calculated bulk density is reported in pounds per cubic foot ($lbs/ft^3$).

Water absorption is determined by the so-called Cone Immersion Method. The method is described below.

CONE IMMERSION ABSORPTION TEST

Developed by Westinghouse Corporation

Test Container:
1. A cone of 60 mesh U.S. Standard copper screen having a base of 2.75" and a height of 3".
2. A 400 ml beaker.
Absorbates:
1. Lube oil—SAE #10 Penna. lube oil—30.4° A.P.I. gravity.
2. Cutting oil—Solvol. D.A. Stuart Company; 1 ml Solvol to 19 ml tap water.
3. Water—tap water.
Procedure:
1. Place 10 g of test material in tared cone; if any particles pass through screen, return them to top of cone.
2. Weigh cone and contents, report $W_1$.
3. Fill beaker to height of 3" with absorbate.
4. Immerse cone and contents in absorbate for 20 minutes.
5. Remove cone and allow to drain freely for two hours.
6. Weigh cone, report $W_2$.
Calculation:
Weight of cone in grams: $W$
Weight of cone with dry material in grams: $W_1$
Weight of cone with wet material in grams: $W_2$ $$\text{Absorption \%} = \frac{W_2 - W_1}{W_1 - W} \times 100$$

Particle size and the particle size distribution is determined by sieving an aliquot of the granules and determining the amount of granules that is passed through and/or retained by each of a series of screens having different mesh sizes. The sieve screen mesh sizes referred to herein are those of the U.S. Standard Sieve Series (ASTM Specification E-11-70). Two mesh sizes reported together and separated by a virgule (/) indicate passage of the granules through the first-noted mesh size and retention by the second mesh size. Similarly, a plus sign (+) in conjunction with a reported mesh size indicates retention by that particular screen and a minus sign (−) in conjunction with a reported mesh size indicates that the granules passed through that particular screen.

EXAMPLE 1

A 6/40 Blend of Clay and Paper Granules

A blend of 75 wt.-% clay granules (bulk density 33.09 $lbs/ft^3$; M about 1.7 mm; σ about 1.6) and 25 wt.-% paper granules (bulk density 7.81 $lbs/ft^3$; M about 2.1 mm; σ about 1.3) was prepared by commingling Georgia clay granules with paper granules. All granules passed through a U.S. Sieve Series No. 6 mesh screen and were retained on a U.S. Sieve Series No. 40 mesh screen. The commingling was done by combining both types of granules in a plastic container, sealing the container, and then agitating the container to provide a substantially uniform contents.

The bulk density of the produced blend was observed to be 18.09 $lbs/ft^3$, which value is less than the calculated bulk density of 26.77 $lbs/ft^3$ based on the relative amounts of clay and paper granules present.

Water absorption for the blend was found to be 1.919 wt.-% which compares favorably to the calculated expected water absorption value of 1.88 wt.-%.

EXAMPLES 2-11

Water Absorption of Clay and Paper Granule Blends

In a manner similar to Example 1, the water absorption and bulk density of various clay/paper granule blends was investigated. The data are compiled in Tables I and II, below.

TABLE I

| Water Absorption by 6/40 Granules | | |
|---|---|---|
| Percent Paper, by wt. | Absorption (g $H_2O$/g paper) | Density (lb/ft.$^3$) |
| 100 | 3.9 | 7.8 |
| 75 | 2.9 | 8.8 |
| 50 | 2.3 | 12.1 |
| 25 | 1.9 | 18.1 |

TABLE I-continued

| Water Absorption by 6/40 Granules | | |
|---|---|---|
| Percent Paper, by wt. | Absorption (g H₂O/g paper) | Density (lb/ft³) |
| 0 | 1.2 | 33.1 |

TABLE II

| Water Absorption by Mixture of Granule Blends (20 wt.-% 2/6 & 80 wt.-% 6/40) | | |
|---|---|---|
| Percent Paper, by wt. | Absorption (g H₂O/g paper) | Density (lb/ft³) |
| 100 | 3.4 | 7.3 |
| 75 | 2.9 | 9.5 |
| 50 | 2.1 | 12.2 |
| 25 | 1.9 | 18.2 |
| 0 | 1.2 | 33.0 |

Sieve analyses of the granules utilized for Examples 2–11, inclusive, are set forth in Tables III–VI, below.

TABLE III

| Sieve Analysis of Paper Granules | | |
|---|---|---|
| Sieve Size | | Cumulative Weight Percent of Undersized Particles |
| Mesh | mm | |
| 3½ | 5.60 | 76.9 |
| 4 | 4.75 | 68.4 |
| 6 | 3.35 | 44.0 |
| 8 | 2.36 | 19.9 |
| 12 | 1.70 | 5.7 |
| 16 | 1.18 | 1.1 |
| 20 | 0.60 | 0.3 |

Mean particle size, M - 3.5 mm
Standard Deviation, σ - 1.8

TABLE IV

| Sieve Analysis of 6/40 Mesh Paper Granules | | |
|---|---|---|
| Sieve Size | | Cumulative Weight Percent of Undersized Particles |
| Mesh | mm | |
| 6 | 3.35 | 97.9 |
| 8 | 2.36 | 49.4 |
| 12 | 1.70 | 13.4 |
| 16 | 1.18 | 2.7 |
| 20 | 0.85 | 0.4 |
| 30 | 0.60 | 0.3 |
| 40 | 0.425 | 0.3 |

Mean particle size, M - 2.1 mm
Standard Deviation, σ - 1.3

TABLE V

| Sieve Analysis of Clay Granules | | |
|---|---|---|
| Sieve Size | | Cumulative Weight Percent of Undersized Particles |
| Mesh | mm | |
| 3½ | 5.60 | |
| 4 | 4.75 | 99.9 |
| 6 | 3.35 | 93.3 |
| 8 | 2.36 | 78.4 |
| 12 | 1.70 | 61.3 |
| 16 | 1.18 | 45.7 |
| 20 | 0.60 | 28.5 |

Mean particle size, M - 1.05 mm
Standard Deviation, σ - 2.2

TABLE VI

| Sieve Analysis of 6/40 Mesh Clay Granules | | |
|---|---|---|
| Sieve Size | | Cumulative Weight Percent of Undersized Particles |
| Mesh | mm | |
| 6 | 3.35 | 99.2 |
| 8 | 2.36 | 73.0 |
| 12 | 1.70 | 46.9 |
| 16 | 1.18 | 28.1 |
| 20 | 0.85 | 11.7 |
| 30 | 0.60 | 2.9 |
| 40 | 0.425 | 2.8 |

Mean particle size, M - 1.7 mm
Standard Deviation, σ - 1.6

We claim:

1. A particulate absorbent material constituted by a blend of discrete clay granules and discrete paper granules; the weight ratio of paper granules-to-clay granules being in the range of about 0.09 to about 9.

2. The particulate absorbent material in accordance with claim 1 wherein said granules have a particle size of less than about 5.6 millimeters.

3. The particulate absorbent material in accordance with claim 1 wherein the paper granule-to-clay granule weight ratio is about 1:3.

4. The particulate absorbent material in accordance with claim 1 wherein the granules pass through a No. 6 mesh U.S. Standard Sieve but are retained on a No. 40 mesh U.S. Standard Sieve.

5. The particulate absorbent material in accordance with claim 4 wherein the paper granule-to-clay granule weight ratio is about 1:3.

6. The particulate absorbent material in accordance with claim 1 wherein said paper granules include a bacteriostat.

7. The particulate absorbent material in accordance with claim 1 wherein said paper granules include an acidulant.

8. The particulate absorbent material in accordance with claim 1 wherein said paper granules include an acidic buffer system.

9. The particulate absorbent material in accordance with claim 1 wherein said clay granules have a mean particle size of about 1 millimeter and said paper granules have a mean particle size of about 3.5 millimeters.

10. The particulate absorbent material in accordance with claim 1 wherein said clay granules have a mean particle size of about 1.7 millimeters and said paper granules have a mean particle size of about 2.1 millimeters.

11. The particulate absorbent material in accordance with claim 1 wherein the weight ratio of paper granules-to-clay granules is in the range of about 0.09 to about 0.5.

12. An absorbent blend of clay and paper granules having a bulk density of about 18 pounds per cubic foot and passing through a U.S. Sieve Series No. 6 mesh screen but retained on a U.S. Sieve Series No. 40 mesh screen; said clay granules having a mean particle size of about 1.7 millimeters and exhibiting a geometric standard deviation of about 1.6; and said paper granules having a mean particle size of about 2.1 millimeters and exhibiting a geometric standard deviation of about 1.3.

* * * * *